Feb. 8, 1966 A. CAUVIN 3,233,253
SEAT WITH CLIP ON UPHOLSTERY
Filed Sept. 17, 1964
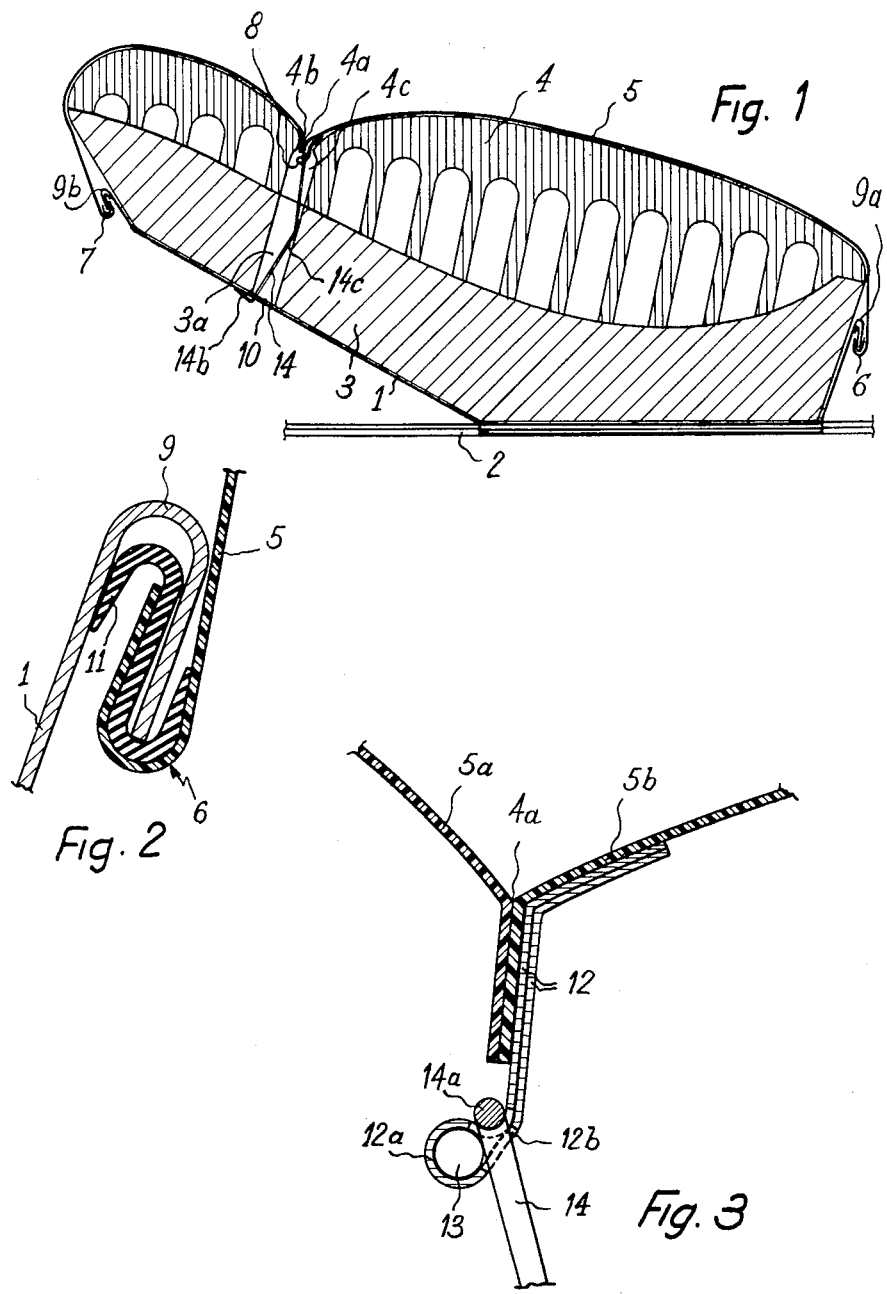
Inventor
André Cauvin
By Stevens, Davis, Miller + Mosher
Attorneys 3,233,253
SEAT WITH CLIP ON UPHOLSTERY
André Cauvin, Port-Marly, France, assignor to Societe
Anonyme dite: Simca Automobiles, Paris, France
Filed Sept. 17, 1964, Ser. No. 397,091
Claims priority, application France, Sept. 18, 1963,
947,846
2 Claims. (Cl. 5—353.1)

The present invention relates to a seat with clip-on upholstery particularly, but not exclusively, for fitting to motor vehicles.

In current practice in the manufacture of seats, the application of upholstery covering on the pad or "cushion" of the seat necessitates the use of skilled workmanship, and is time-consuming and costly.

An object of the present invention is to avoid or minimise this disadvantage as well as to allow the simple replacement of damaged upholstery in an economic fashion.

A seat with clip-on upholstery according to the invention, is characterised in that for the actual seat portion and if desired also, a backrest which may be articulated thereto, there is provided a rigid framework constituting reinforcement, a pad being placed in or on the framework, and a prefabricated upholstery covering being applied over the pad, means being provided to clip the covering on the framework.

In one embodiment, the means for clipping the upholstery covering to the framework of the seat are constituted by at least one S-shaped fitting fixed to the edges of the covering and co-operating with U-shaped turned over portions provided for this purpose on the said framework.

If desired, the means for clipping the upholstery covering on a pad comprises a transverse concavity in the pad, means being provided for maintaining said covering stretched to conform to said concavity.

In order that the invention may be more clearly understood, reference will now be made to the accompanying drawings which show some embodiments thereof by way of example, and in which:

FIGURE 1 is a sectional view in the vertical plane, of a seat according to the invention, and FIGURES 2 and 3 are sectional views, to an enlarged scale, showing embodiments of means for clipping the upholstery to the seat.

The seat, shown in FIGURE 1, comprises a framework, such as a shell I, having base supporting means, shown in the form of slides 2 of the usual kind used in motor vehicles: a lower pad 3 rests in the shell I, and this lower pad can be made in any known manner, for example of horsehair or rubber. An upper pad 4 is applied to the lower pad 3, and is for example of a flexible, honeycombed material.

Said pad is covered by means of an upholstery covering material 5 conforming to the shape of the pad; the covering 5 is removable and comprises clip-on means 6, 7 and 8 (described hereinafter) for clipping it onto the shell I, fitted, for this purpose, with turned-over portions 9a and 9b, and with a hole 10, the purpose of which will be explained later.

FIGURE 2 shows on an enlarged scale, an advantageous embodiment of the clip-on means, such as those shown in FIGURE 1 at 6 and 7, on the turned-over portions 9a and 9b provided on the shell I of the seat: on the end of the covering 5 is fixed an S-shaped fitting II of a material such as hardened rubber or an equivalent plastics material.

The fixing of the fitting II onto the covering 5 may be effected by adhesion, sewing, riveting or any known fixing means.

The fitting II may be inserted into the turned-over portion, shown in FIGURE 2 at 9, of the shell of the seat. The covering 5 is of a plastics material, for example, sufficiently flexible, so that having inserted the first shaped portion, for example, into the portion 9a, one may stretch the covering 5 to allow insertion of the second section of the other end of the fitting into the portion 9b.

FIGURE 1 shows an upper pad 4 which has a transverse concavity 4a. In a seat of this type, it is necessary that the covering 5 be stretched to this position.

For this purpose, a method of clipping said part of the covering 5 is provided as shown in FIGURE 1, although this is more clearly visible on FIGURE 3.

The covering 5 is preferably constituted by two parts 5a and 5b sewn together at the transverse concavity 4a; the ends of the parts 5a and 5b, located beneath the seam are sewn with an adjusting band of upholstery 12, which is bent to form a loop 12a on its lower end.

A slit 4b is provided in the upper pad 4 at the position of its transverse concavity 4a, in order to allow the passage of the band 12 sewn on the ends of the covering; a cavity 4c is located in the upper pad 4 beneath the slit 4b, and continues through a cavity 3a provided in the pad 3 and finally through a corresponding hole 10 provided in the shell I.

The band 12 has a loop 12a in which is inserted a rod 13 of a rigid material and of a length which is slightly less than the size of the upper pad 4.

Clip rods 14 are provided at intervals along the rod 13; each of said clip rods has, at its upper end, a bent portion 14a which is located on the loop 12a adjacent the rod 13, when the clip rod 14 is inserted into the holes 12b arranged for this purpose, in the folded band 12, as is clearly shown in FIGURE 3.

The body of the clip rod 14 passes through the cavities 4c and 3a as well as the hole 10 of the shell I.

Said body ends at its lower part in a bent portion 14b, intended to be supported against the lower external part of the shell I, as is shown in FIGURE 1; this figure also shows a bend 14c given to the body of the clip rod 14, for the purpose of constituting a supporting point for said clip rod on the lower pad 3, which holds the support in the bent portion 14b on the shell I, against vibration during travel.

The length and the shape given to the clip rod 14 are such that the fitting 6 is perfectly applied on to the upper pad 4.

The mounting of the seat which has been described is effected in the following manner: one places the lower pad 3 into the shell I, then the upper pad 4 on to the lower pad 3; the fitting 6 having been prefabricated to the dimensions and shape of the seat, one inserts the rod 13 into the loop 12a, then the clip rods 14 into the holes 12b with their bodies in the cavities 4c and 3c and the hole 10.

The upholstery is applied to the seat, by placing first of all the bent portion 14b beneath the shell I, then by placing the section II of an end of the fitting into the turned-over portion 9b and finally the section II of the other end of the fitting into the turned-over portion 9a.

The covering 5 is thus perfectly stretched and secured on the fitting 6.

An assembling operation of this type may be effected quickly by anyone, and the replacement, for example, of damaged upholstery can be effected economically.

In the preceding description, reference has been made only to that part of a seat constituting the actual seat portion, if the seat comprises a fixed or articulated back, the latter may also be made up in the same way as the actual seat and be similarly clipped in place.

What I claim is:
1. A seat comprising a rigid framework having a hole near its center and a U-shaped turned-over portion at each end, a pad carried by said framework and having a transverse concavity therein, a prefabricated upholstery covering said pad and having an S-shaped fitting fixed to each end thereof, said fittings cooperating with said U-shaped portions to fix said upholstery with respect to said frame, and means disposed in said concavity for stretching said upholstery over said pad.

2. The seat of claim 1 wherein said stretching means comprises a support rod disposed in said concavity and extending through a loop formed in an extension of said upholstery, and a plurality of removable rods having an upper curved portion extending through said hole and being supported on the external portion of said framework.

References Cited by the Examiner

UNITED STATES PATENTS

| | | | |
|---|---|---|---|
| 2,801,682 | 8/1957 | Fridolph | 5—356 |
| 2,876,826 | 3/1959 | Neely et al. | 5—353.3 |
| 3,068,495 | 12/1962 | Quakenbush | 5—353.3 |
| 3,102,755 | 9/1963 | Wilfert | 5—353.2 |
| 3,103,082 | 9/1963 | Baermann | 5—356 |

FOREIGN PATENTS

| | | |
|---|---|---|
| 820,467 | 3/1958 | Great Britain. |
| 894,897 | 12/1960 | Great Britain. |

FRANK B. SHERRY, *Primary Examiner.*

C. A. NUNBERG, *Assistant Examiner.*